July 3, 1928.
J. B. LAW
RIM REMOVER
Filed Feb. 9, 1925
1,675,938
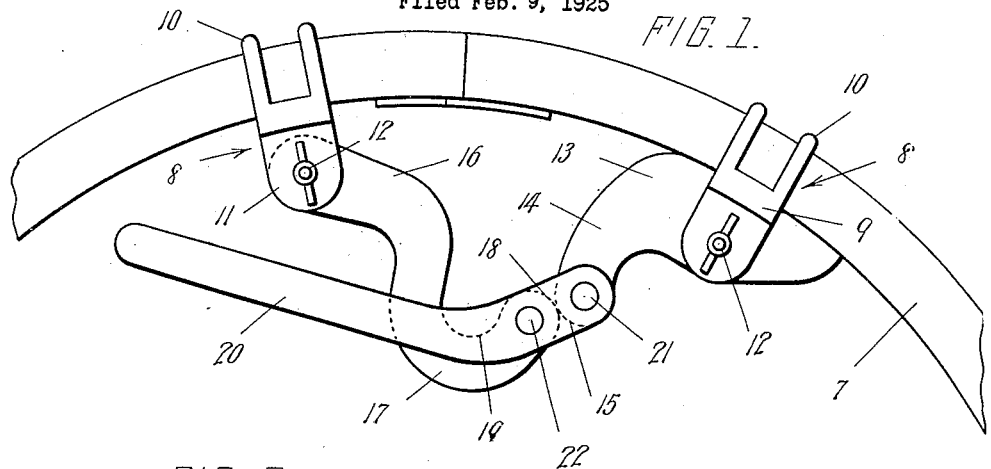
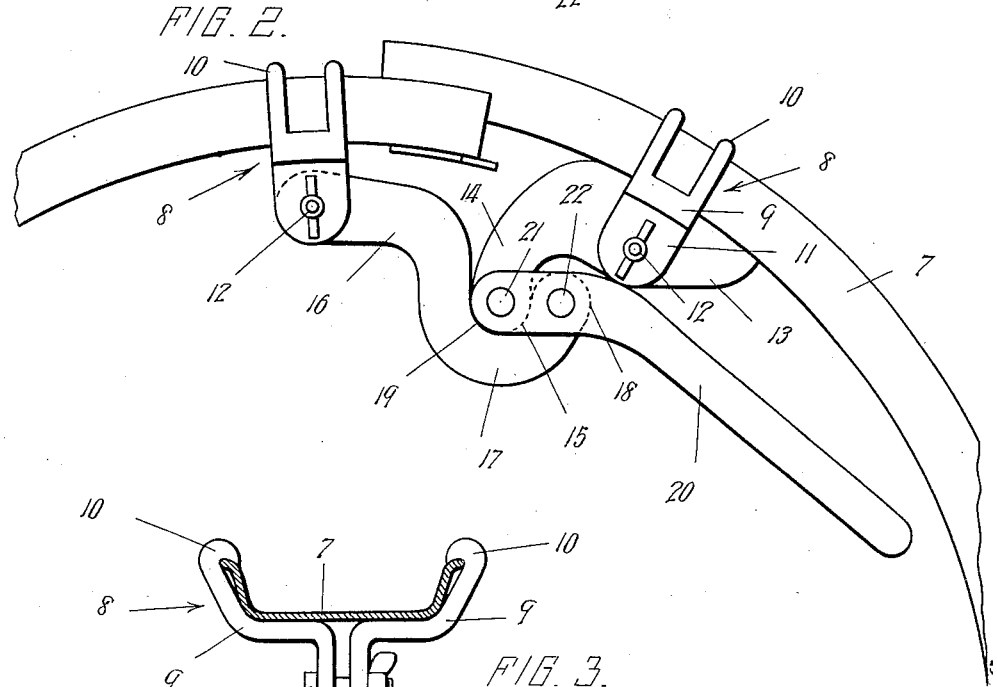
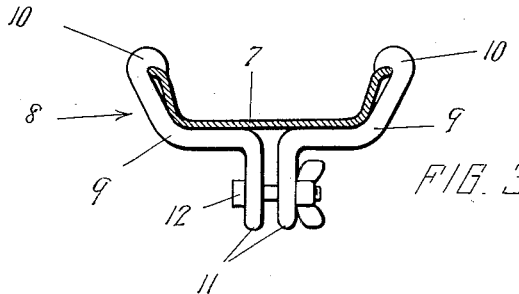
Inventor:
J. B. LAW,
By Monroe E. Miller
Attorney.

Patented July 3, 1928.

1,675,938

UNITED STATES PATENT OFFICE.

JOHN B. LAW, OF JERSEY CITY, NEW JERSEY.

RIM REMOVER.

Application filed February 9, 1925. Serial No. 7,938.

The present invention relates to devices for contracting and expanding the demountable rims of automobile and other vehicle wheels, and aims to provide a novel and improved device of that character attachable to a split rim and operable for conveniently contracting and expanding the rim, and for holding the rim in contracted position, for conveniently removing the rim from and applying it to the tire. Another object is the provision of such a device comprising two members with means for attaching them to the rim, and a lever connecting said members for moving them toward and away from one another for contracting and expanding the rim, said members being of novel formation to interengage one another when contracting the rim so as to hold the rim contracted.

With the foregoing and other objects in view, which will be apparent as the description proceeds, the invention resides in the construction and arrangement of parts, as hereinafter described and claimed, it being understood that changes can be made within the scope of what is claimed without departing from the spirit of the invention.

The invention is illustrated in the accompanying drawing, wherein—

Figure 1 is a side elevation of the device as applied to a rim in expanded condition.

Fig. 2 is a side elevation showing the device operated to contract the rim.

Fig. 3 is a cross section of the rim showing one of the clamps.

Two clamps 8 are provided for conveniently attaching the device to the rim 7 and may be of different sizes and formations for various types of rims. Each clamp 8 is composed of the angular sections 9 having the hooks or claws 10 at their opposite ends to engage the edge portions or flanges of the rim, as seen in Fig. 3, and said sections have the inwardly extending ears 11 at their adjacent ends through which a bolt 12 extends.

A plate or member 13 is disposed between the sections of one clamp and its outer edge is formed to abut the inner periphery of the rim 7, said member having an aperture to receive the bolt 12 of the corresponding clamp. Said member is formed at that end nearest the other clamp with an inwardly curved terminal portion 14 having a rounded end 15, and a bar or link 16 pivotally engages the bolt 12 between the sections of the second clamp, to be swung around said bolt as a pivot in the median plane of the rim. The terminal portion of the bar 16 is offset and formed into a hook, as at 17, and the end of the hook or offset 17 is rounded, as at 18, said hook having the recess 19 of a shape to snugly receive the end 15 of the portion 14, as seen in Fig. 2. The member 13 and bar 16 may be cut or punched from suitable sheet metal.

A lever 20 overlaps the adjacent terminal portions of the member 13 and bar 16, and is pivoted, as at 21 and 22, to the portions 14 and 17, respectively, centrally of the corresponding rounded ends 15 and 18. The ends 15 and 18 are disposed close together or in contact, in order that said ends are movable partially around one another in expanding and contracting the rim, and the portion 14 provides a hook to interlock with the hook or portion 17 when the rim is contracted.

In using the device, the clamps 8 are readily applied to the rim at the opposite sides of the split or division of the rim, as seen in Fig. 1, and the clamps are made fast to the rim by tightening the bolts 12. The device is applied with the parts in the position as seen in Fig. 1, the members 13 and 16 being separated. Then, by swinging the lever 20 around the pivot 12, the bar or member 16 is drawn inwardly to break the joint of the rim and then contract the rim, pulling that end of the rim, to which the bar 16 is connected, inwardly in overlapping relation with the opposite terminal of the rim, as seen in Fig. 2. When swinging the lever 20 the end 18 of the bar 16 moves around the end 15 of the member 13, and the hooks 14 and 17 interlock, as seen in Fig. 2, the end 15 seating in the recess 19 and the end 18 engaging behind the hook or portion 14. This will lock the rim in contracted condition. With the rim contracted it may be readily removed from or applied to the tire, and when the rim is positioned within the tire the rim may be conveniently expanded by swinging the lever backwardly from the position as shown in Fig. 2 to the position shown in Fig. 1. This will separate the members 15 and 16, thereby expanding the rim and bringing the ends thereof into registration. The device is then quickly removed by loosening the bolts 12 and disengaging the clamps from the rim.

Having thus described the invention, what is claimed as new is:—

A rim remover comprising two clamps each composed of a pair of sections adapted to bear against the inner periphery of a demountable wheel rim, the sections of each clamp having outstanding hooks at their opposite ends to engage the flanges of the rim and said sections having inturned ears at their adjacent ends, each clamp including a clamping bolt extending through said ears of the clamp sections for drawing said ears toward one another and causing said sections to bear against the inner periphery of the rim, a plate disposed between the ears of one clamp and having an outer edge formed to bear against the inner periphery of the rim to prevent turning movement of said plate, the bolt of said clamp engaging through said plate, a bar having one end portion engaging the bolt of the other clamp between the ears of said clamp, said plate having a portion extending toward the center of the rim and curved away from the second named clamp, and a lever pivotally connected with said portion and said bar, said bar being offset adjacent to the lever away from the rim to receive said portion so that said portion and offset hook together when the lever is swung to move the clamps toward one another.

In testimony whereof I hereunto affix my signature.

JOHN B. LAW.